United States Patent [19]

Paladino

[11] 4,364,316

[45] Dec. 21, 1982

[54] APPARATUS FOR PLANTING SEEDLINGS

[75] Inventor: Anthony Paladino, Woodstock, Canada

[73] Assignee: Timberland Equipment Limited, Ontario, Canada

[21] Appl. No.: 269,506

[22] Filed: Jun. 1, 1981

[30] Foreign Application Priority Data

Feb. 20, 1981 [CA] Canada .................. 371394

[51] Int. Cl.³ ............................................ A01C 11/00
[52] U.S. Cl. ...................................................... 111/3
[58] Field of Search ...................... 111/2, 3, 89, 90, 91; 267/166, 167, 169, 170

[56] References Cited

U.S. PATENT DOCUMENTS

| 2,003,390 | 6/1935 | Poll et al. | 111/3 |
| 2,103,710 | 12/1937 | Carner | 111/4 |
| 2,216,923 | 10/1940 | Poll | 111/3 |
| 2,625,122 | 1/1953 | Carelock | 111/3 |
| 3,150,620 | 9/1964 | Popplewell | 111/4 |
| 3,176,635 | 4/1965 | Mabon | 111/3 |
| 3,246,615 | 4/1966 | Poll | 111/2 |
| 3,921,584 | 11/1975 | Alkemade | 111/2 |
| 3,931,774 | 1/1976 | Bradley | 111/3 |
| 4,112,857 | 9/1978 | Bradley | 111/3 |
| 4,290,373 | 9/1981 | Boots et al. | 111/3 |

FOREIGN PATENT DOCUMENTS

| 31470 | 3/1889 | Canada | 111/2 |
| 985573 | 3/1976 | Canada | 111/3 |
| 1000120 | 11/1976 | Canada | 111/2 |
| 1008735 | 4/1977 | Canada | 111/2 |
| 1013210 | 7/1977 | Canada | 111/2 |
| 1024828 | 1/1978 | Canada | 111/3 |
| 1031630 | 5/1978 | Canada | 111/2 |
| 1031631 | 5/1978 | Canada | 111/2 |
| 1031632 | 5/1978 | Canada | 111/2 |
| 1040934 | 10/1978 | Canada | 111/2 |
| 1064329 | 10/1979 | Canada | 111/3 |
| 1075464 | 4/1980 | Canada | 111/3 |
| 411768 | 4/1975 | Fed. Rep. of Germany | 111/3 |
| 1009743 | 6/1952 | France | 111/3 |
| 143257 | 12/1960 | U.S.S.R. | 111/3 |

Primary Examiner—James R. Feyrer
Attorney, Agent, or Firm—Cushman, Darby & Cushman

[57] ABSTRACT

The present invention provides a planting apparatus including a mobile frame suitable for forward travel over the ground. A planting arm is movably mounted to the frame and extends from a mounting location. The planting arm includes a dibble remote from the mounting location and adapted to cut into the ground when the dibble moves toward it during forward travel of the frame. A planter means is carried by the planting arm and is adapted to support a seedling for planting in the cut made by the dibble. The planter means includes upright spaced apart side walls at the rear of the dibble and a bottom ledge which together form a pair of side walls and the bottom respectively of a pocket for receiving and containing a seedling. The apparatus includes an elongated ejector tongue extending downwardly into said pocket to a point adjacent the bottom ledge and which forms a frontal wall for the pocket. An ejector mechanism is operatively connected to the ejector tongue for moving same rearwardly of the pocket to eject the seedling therefrom into the cut formed by the dibble.

17 Claims, 8 Drawing Figures

APPARATUS FOR PLANTING SEEDLINGS

BACKGROUND OF THE INVENTION

This invention relates to improvements in apparatus for the planting of seedlings, particularly seedling trees, in any type of terrain, and particularly in rough terrain created as a result of rocks and boulders disposed at or just beneath the earth surface.

U.S. Pat. No. 3,931,774 issued Jan. 13, 1976 relates to a seedling planter apparatus which may be trailed behind a tractor or other towing vehicle and which may be operated by one man as during the course of a reforestation or other similar project. This apparatus includes a mobile frame adapted to travel over the ground with an arm being pivotally mounted to the frame and extending rearwardly from the mounting location. A dibble is carried by the free end of the arm which is adapted to cut into the ground when the arm is urged toward the ground by a hydraulic actuator during the forward travel of the frame. A seedling planter is carried by the arm rearwardly of the dibble and is constructed to support a seedling for planting in the cut made by the dibble. A dislodging mechanism is provided for dislodging seedlings from the planter into the cut. The apparatus is particularly notable in that it includes a detection device for detecting when the dibble has cut to a predetermined depth into the ground and for activating the seedling dislodging device when the predetermined depth has been reached. Means are also provided for swinging the arm toward and away from the ground. In the event that the dibble fails to achieve the predetermined depth due to an obstacle such as a rock or boulder, the seedling dislodging device fails to operate.

Planting apparatus designed and constructed by the assignee of the present invention following the general principles outlined in the above noted patent has been found to operate very effectively. The particular embodiment described in the above noted patent illustrates a planting means adapted to plant "bare root" tree seedlings. As is well known in the art, these seedlings are grown in a nursery to an age of approximately three years then lifted from the nursery and taken to the field where they are planted at the appropriate spacing exactly in the same bare root condition as they were pulled from the earth at the nursery.

The equipment described in the above noted patent is capable of planting the bare root tree seedlings in a fairly efficient manner. However, with the use of the equipment as illustrated in the above patent, problems can arise in that during the planting process the root of the seedling may be dragged in the cut made by the dibble thus curling the root around into the shape of a "J". This problem is fairly common in mechanized planting operations and the term "J-root" has become a well known term in this art. "J-root" tends to impair the normal developments of the tree seedling and its elimination is considered to be most desirable.

A newer technology which assists in overcoming the J-root problem involves growing each seedling at the nursery in a small container, which container may be in the form of a hollowed out pocket or cavity in a block of styrofoam or alternatively the tree may be grown in a cylindrical tube of special paper. When the seedlings are planted in the field, their roots are surrounded by a plug of the nursery earth and sometimes even the paper container which eventually disintegrates. The container seedlings require special attachments to the planter to allow mechanized planting.

SUMMARY OF THE INVENTION

It is a basic object of the present invention to provide planting apparatus of the type described above which assists in overcoming the J-root problem referred to above.

It is a further object of the invention to provide planting apparatus of the type described above wherein the planter includes an elongated ejector tongue capable of pushing essentially the entire seedling including its roots out of the planting device at essentially the same speed as the machine so that the root is not dragged in the furrow into the shape of a J.

It is a further object of the invention to provide a seedler planting apparatus including an elongated ejector tongue as noted above with the planting mechanism being provided with resiliently yieldable means designed to avoid damage to the planter apparatus in the event that the elongated ejector tongue comes into contact with a boulder or some other obstacle during the course of its movement.

It is a further object of the present invention to provide seedling planting apparatus of the type described above which is specially adapted for the planting of containerized seedlings.

Accordingly therefore the present invention provides a planting apparatus including a mobile frame suitable for forward travel over the ground. A planting arm is movably mounted to the frame and extends from a mounting location. The planting arm includes a dibble remote from the mounting location and adapted to cut into the ground when the dibble moves toward it during forward travel of the frame. A planter means is carried by the planting arm and is adapted to support a seedling for planting in the cut made by the dibble. The planter means includes upright spaced apart side walls at the rear of the dibble and a bottom ledge which together form a pair of side walls and the bottom respectively of a pocket for receiving and containing a seedling. The apparatus includes an elongated ejector tongue extending downwardly into said pocket to a point adjacent the bottom ledge and which forms a frontal wall for the pocket. An ejector mechanism is operatively connected to the ejector tongue for moving same rearwardly of the pocket to eject the seedling therefrom into the cut formed by the dibble.

As a further aspect of the invention the ejector mechanism includes motor means (such as a hydraulic actuator) on the planting arm for moving the ejector tongue rearwardly and forwardly of the pocket. The ejector mechanism further includes a resilient means interposed between the motor means and the ejector tongue and capable of yielding under the influence of abnormal forces which otherwise might cause damage to the apparatus.

In the preferred form of the invention the planter means further includes a cover mounted for movement between a closed position where it forms the rear wall of the pocket and an open position permitting escape of the seedling from the pocket with mechanism being connected to the cover for moving same to the open position upon rearward movement of the ejector tongue.

In the preferred embodiment of the invention, the cover is mounted for pivotal motion in a vertical plane and the above mechanism connected thereto is also connected to a point fixed relative to the planting arm such that rearward and forward motion of the ejector tongue causes the cover to open and close respectively. In the embodiment described hereinafter the cover is hinged to the ejector tongue to provide for its pivotal movement with the cover means being further shaped and constructed such that in its closed position it defines, along with the above noted ejector tongue and pocket side walls, an open topped entrance to said pocket to allow easy placement of a seedling in the pocket by the machine operator. Placement of a containerized seedling in the pocket is done when the planting arm is in the up position.

The above referred to ejector mechanism preferably includes a housing fixed to the planting arm with the resilient means including a tubular casing slidably extending through the housing and having a spring therein which is compressible in the direction of movement of the above noted motor means which typically is a hydraulic actuator. One end of the tubular casing is secured to the ejector tongue at substantially a right angle thereto whereby the ejector tongue is guided in a straight line path by virtue of the tubular casing sliding within the housing. The spring within the tubular casing is operably connected to the hydraulic actuator, such spring being sufficiently stiff that under normal conditions the motion of the hydraulic actuator ram is transmitted by the spring means to the tubular housing and thence to the ejector tongue. However, in the event that some obstruction prevents movement of either the ejector tongue or the pocket cover, the spring will yield under the abnormal forces thus arising thereby to allow a relative motion between the actuator ram and the tubular casing thereby preventing damage to the equipment.

A typical embodiment of the invention will, in common with the teachings of the above noted U. S. Pat. No. 3,931,774, include a device for sensing the depth the dibble has penetrated the ground and a system for actuating the ejector mechanism to cause the ejection of a seedling after a selected depth has been sensed. Packing means will also be provided adapted to close the cut in the earth and to pack soil around the seedling after its placement in the cut.

BRIEF DESCRIPTION OF VIEW OF DRAWINGS

A typical embodiment of the invention will now be described, reference being had to the accompanying drawings in which.

DETAILED DESCRIPTION OF PREFERRED EMBODIMENT

Figure 1:
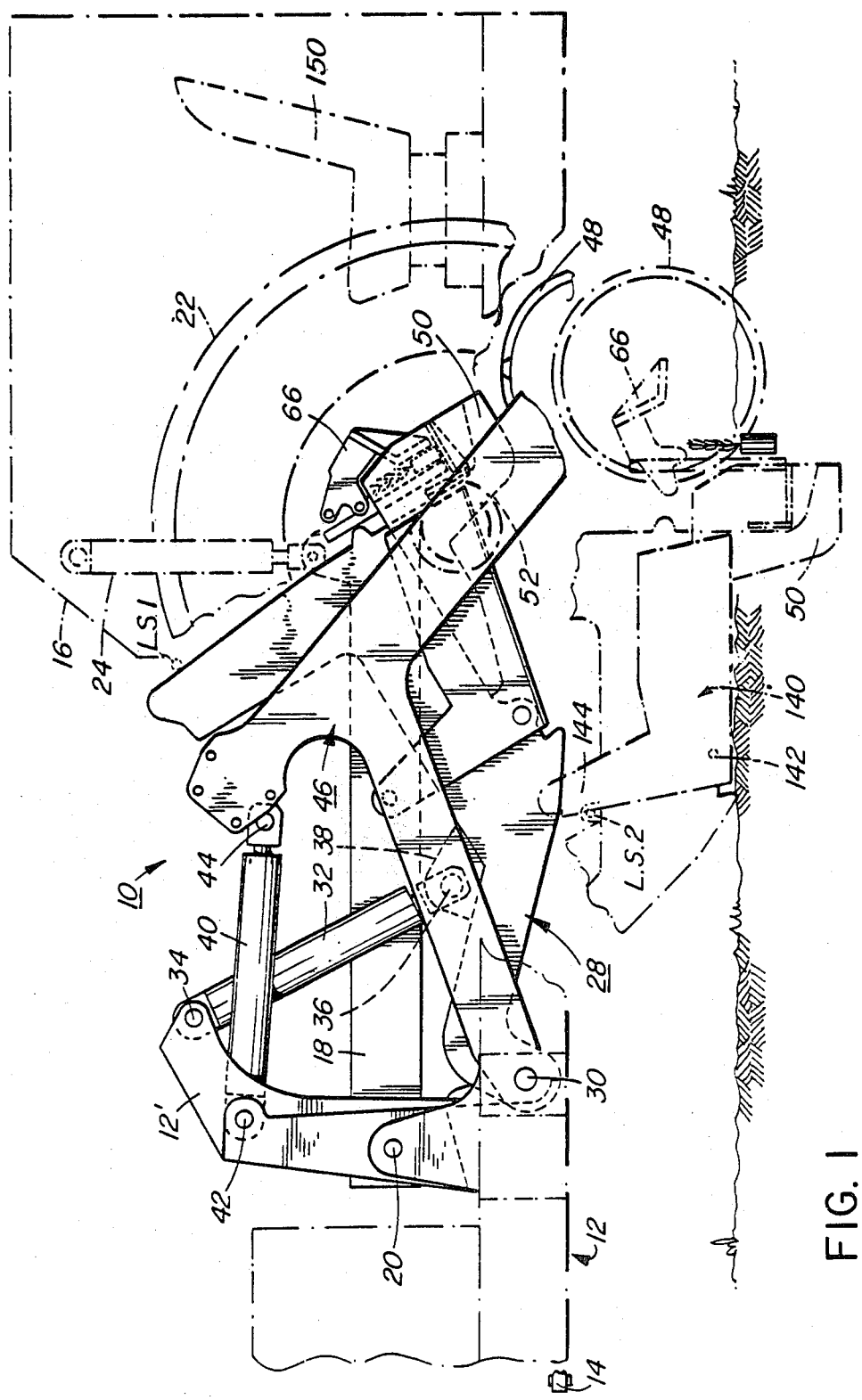
FIG. 1 is a simplified section view of certain of the basic components of a planting apparatus embodying the invention.

Referring firstly to FIG. 1, it should be appreciated that this view is somewhat simplified as compared with the actual embodiment in that the view is intended to illustrate the basic components of the apparatus without the unnecessary complications that would result from the drawing of a complete and accurate sectional view. Generally speaking, FIG. 1 is to be considered as a view of part of the apparatus as would be seen by taking a longitudinal section vertically of the apparatus but many components are somewhat simplified as compared to what a true section would show with a portion of the non-essential detail being omitted. Where not otherwise specified, the pivot axes for the various components are to be taken as perpendicular to the plane of the drawing paper.

The tree planter shown in the drawings is a single row intermittent furrow planter typically having an independent self-contained power unit, hydraulic and electrical systems and is connected, in use, to a prime mover, such as a bulldozer, by a towing pin. The planter requires an operator to load the seedling trees into the planting mechanism and to activate the planting cycle.

The planting apparatus 10 includes a frame generally indicated at 12 having a forward end 14 in the form of a towing tongue 14 adapted to be connected to a bulldozer. The bulldozer (not shown) is typically outfitted with a suitable scraper blade to clear brush, stumps and other debris from the planter's path.

The frame 12 of the planter consists of the main frame and a cab enclosure (shown in phantom) which is fabricated from welded steel components all sized and arranged to provide the necessary strength and rigidity as to withstand the rugged conditions encountered during use. The main frame houses all the main moving components which are typically covered by plate steel hoods (not shown).

The suspension system for the planter is in the form of a pair of walking beams, one of which is shown as item 18, pivotally connected to the frame 12 at pivot axis 20, one beam 18 on each side of the planter. The planter rides on two wheels 22 each of which is connected to a respective one of the beams 18, wheels 22 being equipped with skidder-type forestry tires set at low pressure. Each walking beam 18 is connected to a hydraulic actuator 24, the upper end of the latter being connected to a portion of the frame structure, with the hydraulic actuators 24 permitting the planter to be raised or lowered as desired and also to enable the planter to be levelled when planting is being carried out on side slopes.

The front portion of frame 12 carries a suitable drive engine which is connected to a hydraulic pump for supplying the several hydraulic actuators with a generator being supplied to provide the required electrical power.

A planting arm 28 is pivotally mounted to frame 12 via main pivot shaft 30 with the planting arm 28 extending rearwardly from the pivot point. The planting arm pivots upwardly and downwardly in an imaginary medial plane parallel to the longitudinal axis of the planter. A hydraulic actuator 32 has its one end 34 pivotally secured to frame superstructure 12' and has its other end 36 pivotally secured to planter arm 28 by way of an upstanding lug 38 on the planter arm. Extension and retraction of the hydraulic actuator 32 causes the planter arm 28 to pivot about the primary pivot 30.

Figure 3:
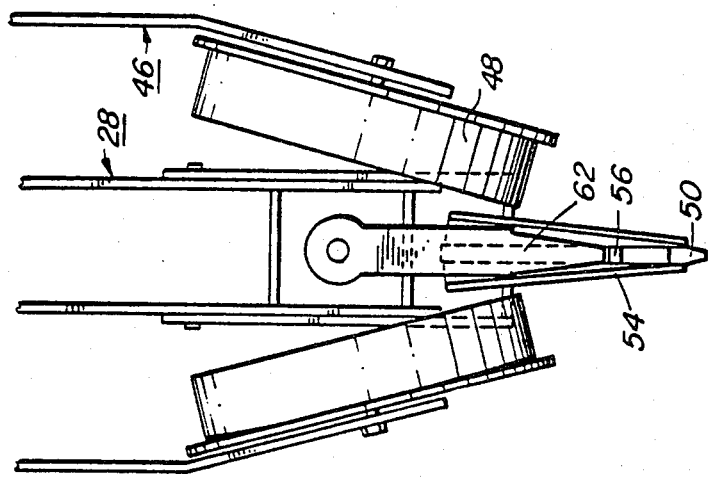
FIG. 3 is a simplified rear elevation view of the same structure as is shown in FIG. 2.
Figure 2:
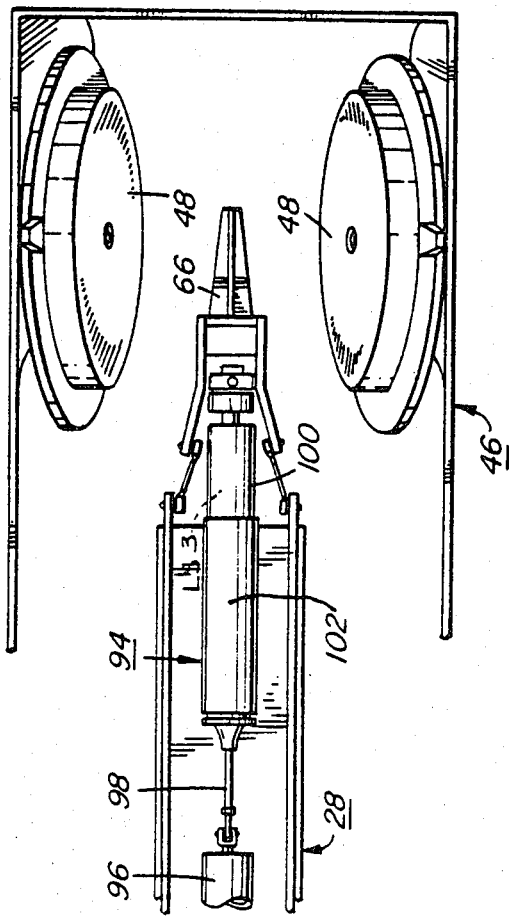
FIG. 2 is a simplified plan view illustrating portions of the planting arm, the ejection means, and the packing wheels associated therewith.

A further hydraulic actuator 40 has its forward end connected at pivot 42 to frame superstructure 12' while its other rearwardly disposed end is connected at pivot 44 to a crossbeam (not shown) which, in turn, is affixed to a laterally spaced pair of packing arms 46. The packing arms 46 are disposed in flanking relationship to the planting arm 28 and are pivoted at their forward ends to frame 12 by way of the previously mentioned primary pivot 30. The packing arms 46 extend rearwardly and then downwardly with their respective lower ends each being connected to an associated packing wheel 48. As best seen in FIGS. 2 and 3, the packing wheels 48, in their lowered positions, are arranged to contact the ground closely adjacent the rear of the planting arm, such packing wheels 48 being toed inwardly as best seen in FIG. 3 thereby to enhance their capability to close the cut or furrow cut by the planting apparatus and to tamp the earth around and against the planted seedling.

Figure 4:
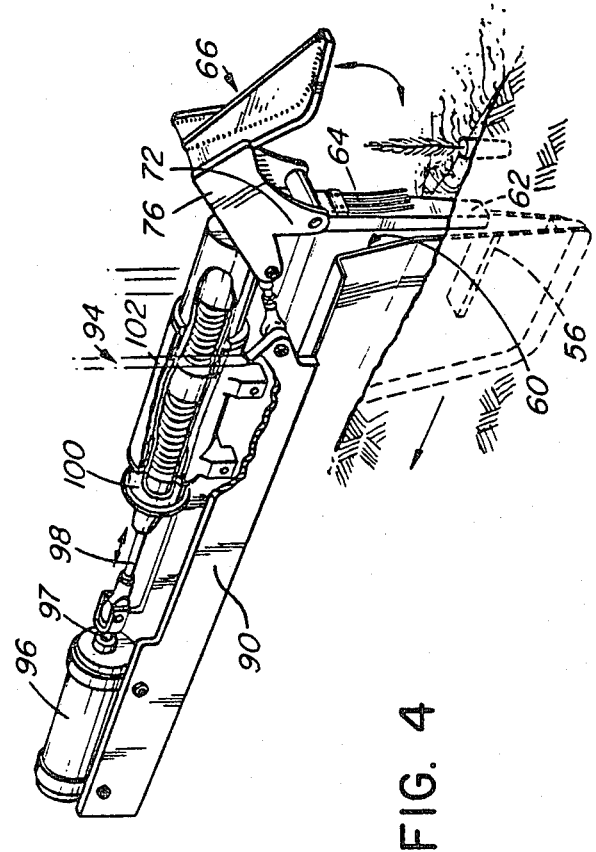
FIG. 4 is a perspective view of the dibble and the planter means, including the ejector mechanism.
Figures 6, 7:
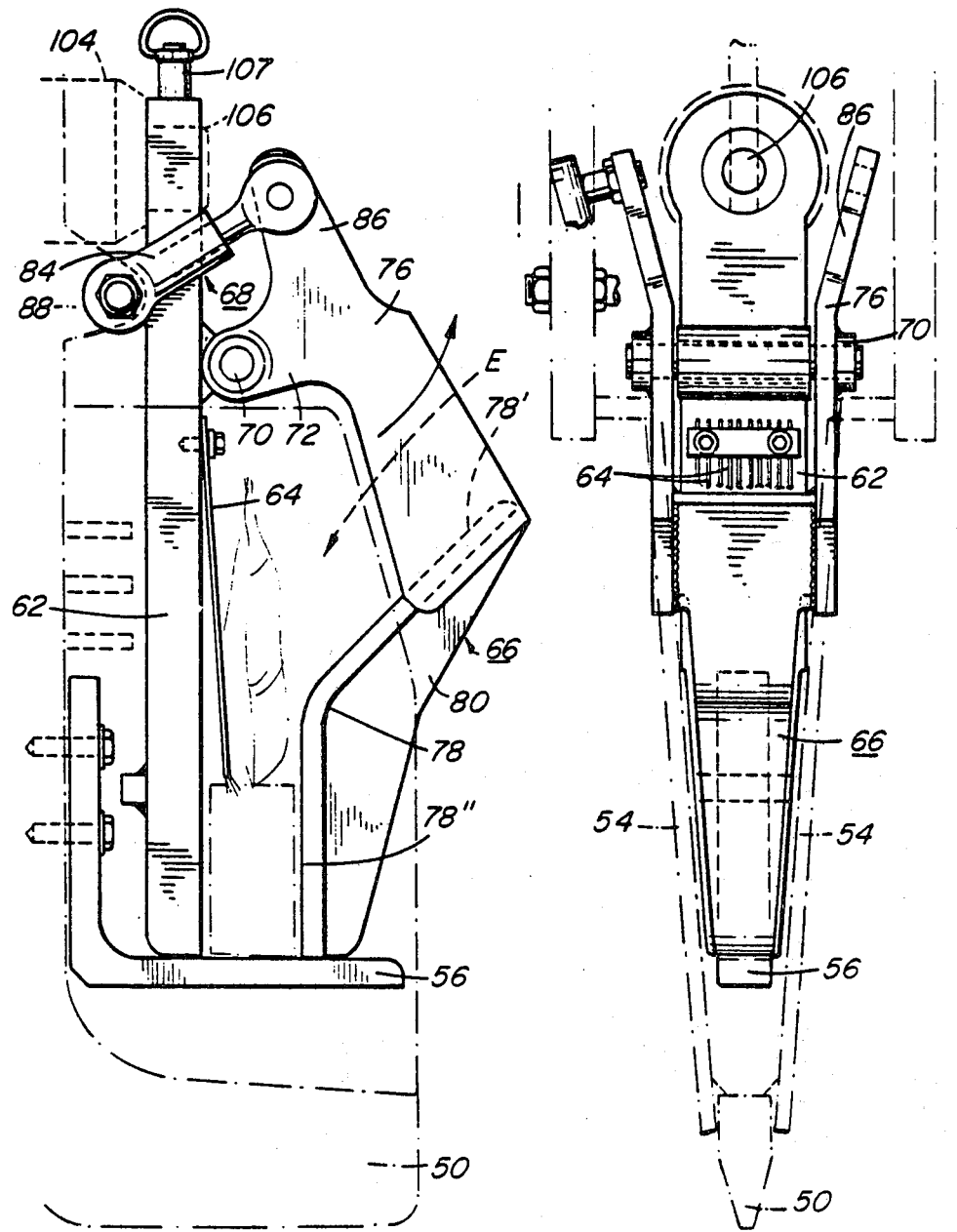
FIG. 6 is a side elevation view of the ejector tongue and the swingably mounted cover, portions of the dibble being shown in phantom.
FIG. 7 is a rear end elevation view of the planter including portions of the ejector tongue and the swingable cover.

The planting arm 23 carries at its end remote from the primary pivot 30 a dibble 50 which is adapted to cut into the ground when the dibble 50 is urged toward it by means of the hydraulic actuator 32. Generally speaking, the dibble 50 is of a sturdy welded construction including a relatively sharp leading edge 52 to allow it to slice more readily into the ground. Extending rearwardly of the dibble 50 and securely welded thereto along their forwardly disposed edges and along their bottom edges are a pair of upright spaced apart side walls 54 which diverge away from one another slightly in the upward direction as best seen in FIG. 7. Disposed between side walls 54 and in spaced generally parallel relation to the lower edge of dibble 50 is a ledge 56. The spaced apart side walls 54 and the ledge 56 together form a pair of side walls and the bottom respectively of a pocket for receiving and holding a containerized seedling in an upright position prior to planting. The pocket is designated by reference number 60. Extending downwardly into designated by reference number 60. Extending downwardly into pocket 60 to a point closely adjacent the ledge 56 and forming a frontal wall for the pocket 60 in its forward position is an elongated ejector tongue 62. The ejector tongue 62 is in the form of a flat plate which tapers downwardly in width toward its bottom thereby to allow it to move freely to and fro between the spaced side walls 54. The ejector tongue moves in a straight line path of travel between the forwardly disposed position illustrated in full lines in FIG. 6 and the rearwardmost position illustrated in dashed lines. In the rearwardmost position of the ejector tongue, its rearward surface is disposed just slightly outwardly of or beyond the rearwardly disposed terminal edges of the side walls 54. As ejector tongue 62 moves rearwardly it applies forces to the seedling substantially all along its length thus ensuring that the seedling is maintained in a substantially upright position as it is moved into the furrow or cut made by the dibble as best illustrated in FIG. 4. The rear face of ejector tongue 62 is also provided with a plurality of downwardly extending relatively stiff nylon bristles 64 which engage the containerized seedling thus assisting in preventing it from jumping upwardly, especially during the lowering of planting arm 28 and during the course of the ejection procedure.

With further reference to FIGS. 4, 6 and 7, it will be seen that the planter means further includes a cover assembly 66 which is mounted for movement between a closed position where it forms the rear wall of the pocket 60 and an open position (FIG. 4) permitting escape of the seedling from the pocket. A linkage mechanism 68 is connected to the cover assembly 66, such mechanism being arranged to move the cover assembly to the open position upon rearward movement of the ejector tongue 62. Cover assembly 66 is hinged to ejector tongue 62 via hinge assembly 70, the latter including a hinge pin extending transversely to the length of ejector tongue 62 with cover assembly 66 including spaced apart ears 72 through which the pin of hinge assembly 70 passes. Ears 72 form a part of spaced apart side plates 76, the latter, in turn, being rigidly secured to the tapered wall portion 78 which, in the closed position of cover assembly 66, defines the rearward wall of pocket 60. As best seen in FIG. 6, wall portion 78 is formed as an obtuse angle thereby defining, in the closed position of the cover assembly 66, a downwardly and inwardly sloping upper wall portion 78' and a generally vertical lower wall portion 78''. A stiffening rib 80 is welded to the wall portion 78 thereby to prevent the latter from being bent under the influence of the high forces encountered as when as obstacle is struck. Since the side plates 76 are spaced apart, it will readily be seen that in the closed position of the cover assembly 66 the spaced apart side plates 76 and the downwardly, inwardly, sloping upper wall portion 78' form an open topped entrance or throat leading into the pocket 60 which will allow the operator to readily place the containerized seedlings into such pocket in the direction of arrow E with the containerized seedling subsequently falling downwardly and ultimately being fairly closely confined between the side walls 54, the frontal face of ejector tongue 62 and the lower wall portion 78'' and supported upon the previously described ledge 56 forming the bottom of pocket 60.

Previously noted linkage mechanism 68 includes a laterally spaced pair of links 84 having first ends of same pivotally connected to respective tongue portions 86 which are formed as extensions of the above-described side plates 76 of cover assembly 66 while the opposing ends of such links 84 are each connected to a respective ear 88 formed on bracket 90 which, in turn, is rigidly secured to the planting arm 28. In the embodiment shown, the links 84 are adjustable in length thereby to provide small adjustments in the degree to which cover assembly 66 opens or closes, and the opposing ends of such links 84 forming the above-noted pivotal connections are preferably equipped with ball and socket type bearings thereby allowing for a small degree of universal motion of such links arising from the fact that tongues 86 may not be in precise alignment with ears 88.

Figure 5:
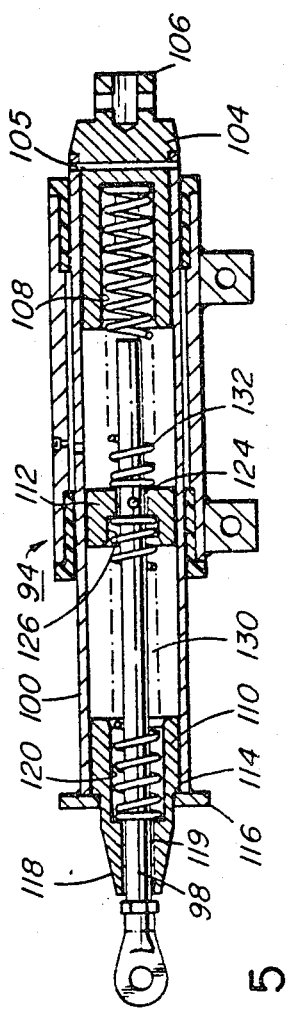
FIG. 5 is a longitudinal section view of a portion of the ejector mechanism.

The upper end of the ejector tongue 62 is rigidly connected to an ejector mechanism 94, the latter being best illustrated in FIGS. 4 and 5. The ejector mechanism is mounted on the above-noted bracket 90 which is affixed to the upper side of planting arm 28. The ejector mechanism 94 includes a hydraulic actuator 96 having its ram 97 connected via rod 98 to a tubular casing 100 which extends slidably through an elongated annular housing 102. Both the hydraulic actuator 96 and the annular housing 102 are rigidly secured by bolts to the above-mentioned bracket 90 so that both of these components are fixed relative to the planting arm 28. The rearward end of the tubular casing 100 is affixed to the upper end of ejector tongue 62 by means of an end piece 104 which fits snugly into the rearward end of the tubular casing 100. This end piece is held firmly in position by means of pin 105. The end piece is provided with a short rearwardly projecting neck 106 which fits snugly into a correspondingly sized bore formed in the upper end of ejector tongue 62 such that the latter is secured generally at right angles to the longitudinal axis of the tubular casing 100 with tongue 62 being secured on neck 106 by means of a pin assembly 107 passing downwardly through mating apertures both in neck 106 and the upper end of tongue 62.

The end piece 104 is provided with an elongated axially extending bore 108 therein which extends from its forward end rearwardly for a selected distance terminating short of pin 105. The tubular casing 100 also contains first and second slidably mounted annular pistons 110 and 112. Piston 110 is disposed at the frontal end of tubular casing 100 and includes suitable shoulder 114 which comes into abutting relationship with annular flange 116 formed on the forward end of casing 100 thereby preventing escape of piston 110 from the casing. Piston 110 includes a neck portion 118 projecting outwardly of casing 100 with the neck portion having a bore 119 extending axially therethrough and through which the ejector rod 98 passes in slidable relation thereto. Piston 110 also contains a somewhat elongated bore 120 therein extending forwardly from the rear face thereof, such bore 120 being of about the same diameter as the bore 108 formed in the end piece 104.

The intermediate piston 112 is slidably disposed within tubular casing 100 and it contains a central bore therein through which the ejector rod 98 passes. A transverse pin 124 passing through piston 112 and rod 98 serves to secure the two of them firmly together. Piston 112 also contains a short bore 126 therein extending inwardly from its frontal face and being of substantially the same diameter as bores 120 and 108.

The tubular casing 100 contains a pair of coil compression springs 130 and 132. Spring 130 extends between pistons 110 and 112 and is seated in their respective bores 120 and 126 while coil spring 132 extends between piston 112 and casing end piece 104, being seated in bore 108 provided in the latter with its opposite end resting against the rearward face of piston 112.

Under normal circumstances, when no serious obstructions are present, the ejector mechanism 94 functions in such a manner that all of the output motion of its hydraulic actuator 96 is transmitted through to the ejector tongue 62. However, if it is assumed that an obstruction is present which would tend to prevent the ejector tongue 62 from moving rearwardly (such as a rock in contact with cover assembly 66 preventing it from opening), and the hydraulic actuator 96 is activated such as to cause rod 98 to move rearwardly, all that will happen is that the coil spring 132 becomes compressed with the actuator rod 98 moving inwardly along the axis of tubular casing 100. This action can continue until the ejector rod has reached the dashed line position within bore 108 of end piece 104 at which time the hydraulic actuator 96 will have reached the end of its stroke.

On the other hand, if it is assumed that the ejector tongue 62 is in its rearward position with the cover assembly 66 open as illustrated in FIG. 4 and hydraulic actuator 96 is activated such as to cause cover assembly 66 to return to its closed position, with some obstruction, such as a tree branch, being present which would tend to prevent such closing, then all that will happen is that the compressive force of coil spring 130 will be overcome thus permitting intermediate piston 112 and ejector rod 98 to move forwardly relative to tubular casing 100 with the coil spring 130 becoming gradually compressed as piston 112 moves nearer to the front piston 110. This action continues until the hydraulic actuator 96 reaches the end of its return stroke.

It will thus be readily appreciated that the mechanism described above provides a valuable safety feature which serves to prevent damage to the equipment under the conditions often encountered during normal use. It will be appreciated that coil springs 130 and 132 are sized and pre-loaded to such an extent that they will begin to compress under loadings which are somewhat less than the loading which would tend to cause damage to any of the working parts of the planter mechanism.

Under normal circumstances, with no obstructions being present, the entire tubular casing 100 moves to and fro along with ejector rod 98 through the fixed annular housing 102, the latter being provided adjacent its opposing ends with suitable annular bushings providing a long wear life.

It was noted previously that the planting apparatus being described herein incorporates means for detecting when the dibble has cut into the earth to a predetermined depth and means for activating the ejector mechanism for dislodging a seedling when the predetermined depth has been reached. Such means as incorporated in the planting apparatus now being described are the same in principle as described in the above-noted U.S. Pat. No. 3,931,774 to which those skilled in the art may refer for more detailed information. A few details however should be mentioned, in particular the general configuration of the trigger plate 140 (see FIG. 1) which activates the planting cycle. This trigger plate 140, which is of generally U-shape configuration when seen in cross section, is pivoted adjacent its forward end at pivot point 142 on the planting arm 28. The trigger plate 140 extends rearwardly along and just below the lower surface of planting arm 28 with the rearward end of trigger plate 140 being arranged in flanking relation to the frontal portion of dibble 50. For this purpose a suitable slot is provided in the lowermost surface of trigger plate 140 to accommodate the leading portion of dibble 50. A spring (not shown) disposed between trigger plate 140 and planting arm 28, tends to bias trigger plate 140 in the clockwise direction as shown in FIG. 1, i.e. away from planting arm 28. Thus, when the planting arm 28 is urged downwardly and the dibble 50 cuts into the ground to the predetermined depth, the trigger plate 140 contacts the ground and it is urged against the biasing spring in the counterclockwise direction. It will be noted that the forwardly disposed portion of trigger plate 140 is provided with upstanding elongated tongue portions 144 which are disposed in flanking relation to the planting beam 28. As trigger plate 140 is rotated in the counterclockwise direction, a point is reached where these tongue portions 144 come into closely spaced relation to a suitable limit switch LS2 (which may be a proximity switch) thus triggering an electrical circuit (not shown) which, in turn, initiates the planting cycle. (Limit switch or proximity switch LS2 can, of course, be substituted by a complete mechanical system.) Switch LS2 is, of course, positionally adjusted so that the planting cycle is initiated only after the correct planting depth is achieved.

It will be appreciated that the specific embodiment described thus far is particularly adapted for use in the planting of containerized seedlings. However, with suitable modifications, the apparatus can be used for planting bare root seedlings as well. In order to adapt the apparatus for use in the planting of bare root seedlings, the cover assembly 66 must, of course, be removed. The apparatus will then be provided with a pair of spaced apart resiliently biased fingers very similar to the fingers 80 shown in the above noted U.S. Pat. No. 3,931,774. Suitable modifications can readily be made to the ejector tongue 62 so as to provide notches or windows thereby to avoid interference between such ejector tongue and the fingers. Because of the fact that the above described ejector mechanism incorporates a safety arrangement preventing overloading and damage to the planter when an obstruction is reached, a full length ejector tongue can be used, the same being very beneficial in the case where bare root seedlings are being planted because the full length ejector tongue serves to support the seedling roots and maintain them in alignment with the stock of the plant during the planting operation. The safety features incorporated in the ejector mechanism described above are particularly advantageous when using an elongated ejector tongue of the type shown in the drawings since such elongated tongue is more prone to coming into contact with rocks and other obstacles which, but for the presence of the safety mechanisms described, would tend to cause breakage.

Figure 8:
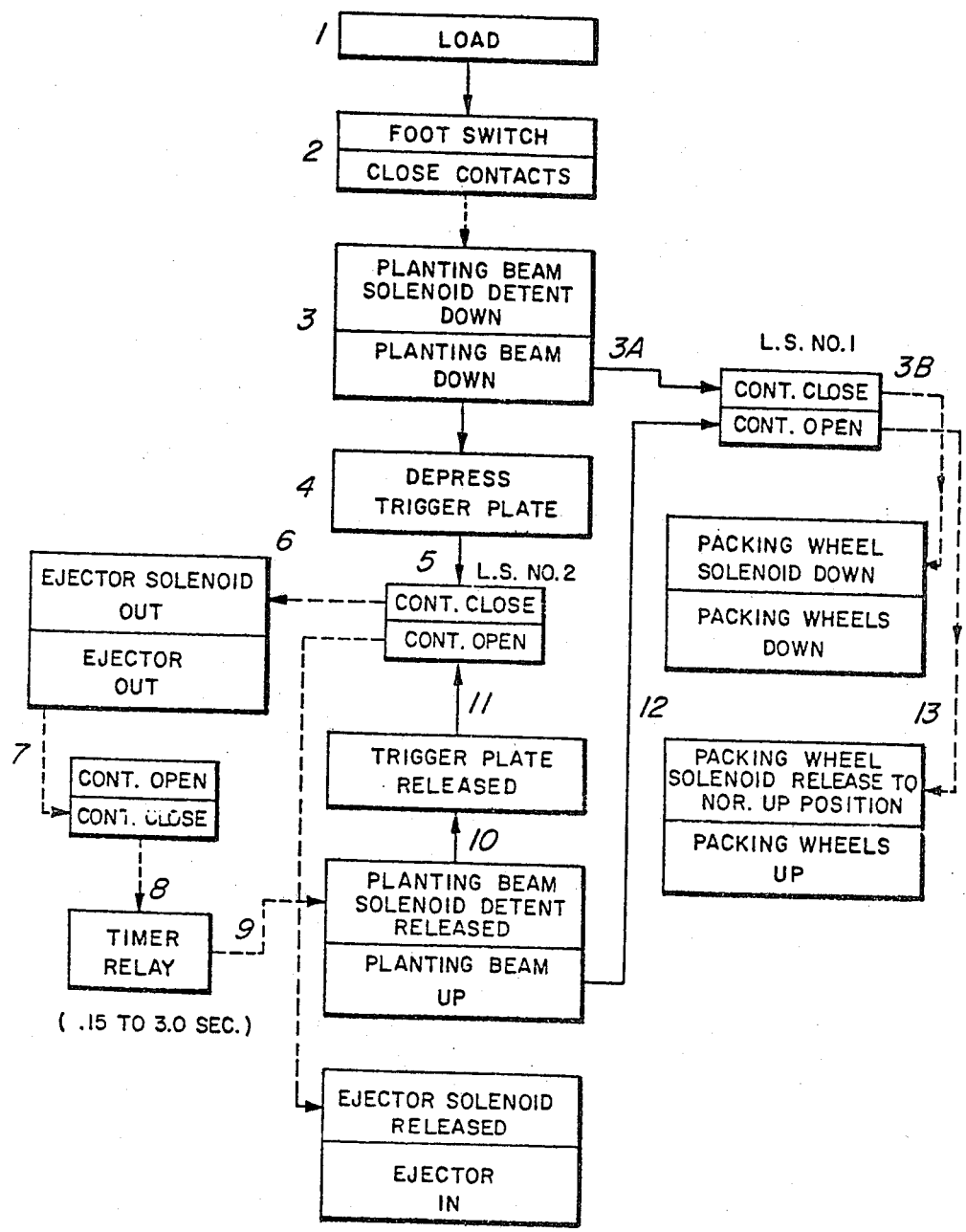
FIG. 8 is a block diagram illustrating the operating sequence of the planting apparatus.

The manner of operation of the apparatus described above will be readily apparent to those skilled in the art. However, for purposes of completeness, reference will be had to the operating sequence illustrated in FIG. 8. The following steps describe a complete machine operating cycle.

1. With the planting arm 28 in the "up" position and the ejector tongue 62 in the forward "in" position with the cover assembly 66 closed, a tree seedling is loaded into the pocket 60 by the operator who is positioned on a seat assembly 150 located rearwardly of the arcuate path of travel taken by the planting arm 28.
2. The operator depresses a foot switch (not shown) to initiate the planting sequence.
3. The foot switch contacts close and energize a planting arm solenoid to a detented "down" position thus activating the hydraulic actuator 32 and causing the planting beam 28 to move downwardly.
3a. As the planting arm 28 moves downwardly, it opens the planting arm contacts on limit switch No. 1 (LS1) and closes the packing wheel contacts on LS1.
3b. Closing the packing wheel contacts energizes the packing wheel solenoid to shift to "down" thus activating hydraulic actuator 40 to cause the packing wheels 48 to move downwardly. (It should be noted that steps 3a and 3b occur almost simultaneously with only a fraction of a second delay between them.
4. As the planting arm dibble 50 penetrates the soil, the soil, in turn, makes contact with trigger plate 140.
5. As the trigger plate 140 is depressed toward the planting arm 28, it eventually closes the contacts on LS2 as the correct planting depth is reached.
6. Closing the contacts on LS2 energizes an ejector solenoid thus activating hydraulic actuator 96 and causing the ejector tongue 62 to move rearwardly out of the pocket while simultaneously opening the cover assembly 66 with the result being that the seedling is ejected into the cut in the soil created by the dibble.
7. The rearward movement of the ejector mechanism closes contacts on LS3 and activates a timer relay.
8. The timer relay engages the planting arm solenoid and holds it in its detented "down" position. The relay timer is adjustable from 0.15 to 3.0 seconds depending upon the planting conditions which must be determined experimentally.
9. As the timer times out, it energizes the planting arm solenoid to release its detent and return to the "up" position. Thus hydraulic actuator 32 causes the planting arm 28 to swing upwardly.
10. As the planting arm 28 moves upwardly it releases the trigger plate 140 from its depressed position.
11. As the trigger plate 140 returns to its normal position it releases LS2 and opens its contacts which, in turn, releases the ejector solenoid.
11a. The ejector solenoid returns to its normal "in" position with the result being that the ejector mechanism retracts or moves forwardly thus moving the ejector tongue forwardly into the pocket 60 and at the same time the cover assembly 66 closes.
12. As the planting arm returns to its "up" position it opens the packing wheel contacts on switch LS1 and releases the packing wheel solenoid.
13. The packing wheel solenoid returns to its "up" position and the packing wheels 48 move upwardly thus completing the cycle.

Although a specific embodiment of the invention has been described, those skilled in the art will realize that various modifications and changes may be made thereto while still remaining within the spirit and scope of the following claims. It should also be noted that although the word "seedling" has been used for purposes of convenience, it is intended that the invention should cover the planting of equivalent or related forms of living matter such as shoots or cuttings which are capable of developing roots after being placed in damp soil.

The embodiments of the invention in which an exclusive property or privilege is claimed are defined as follows:

1. Plant apparatus comprising:
a mobile frame suitable for forward travel over the ground;
a planting arm movably mounted to the frame and extending from a mounting location;
the planting arm including a dibble remote from the mounting location and adapted to cut into the ground when the dibble moves toward it during forward travel of the frame;
planter means carried by the planting arm and adapted to support a seedling for planting in the cut made by the dibble, the planter means including: upright spaced side walls at the rear of the dibble and a ledge which together form a pair of side walls and the bottom of a pocket for receiving and containing a seedling prior to planting, an elongated ejector tongue extending downwardly into said pocket to a point adjacent the ledge and forming a frontal wall for the pocket in its forward position, and an ejector mechanism operatively connected to said ejector tongue for moving same rearwardly of the pocket to eject a seedling therefrom into the cut formed by the dibble, and wherein the planter means further includes
a cover means mounted for movement between a closed position where it forms the rear wall of said pocket and an open position permitting escape of the seedling from the pocket;

and mechanism connected to said cover means for moving same to the open position upon rearward movement of the ejector tongue.

2. Planting apparatus comprising:
a mobile frame suitable for forward travel over the ground;
a planting arm swingably mounted to the frame and extending rearwardly from a mounting location;
the planting arm including a dibble remote from the mounting location and adapted to cut into the ground when the dibble is urged toward it during forward travel of the frame;
planter means carried by the planting arm and adapted to support a seedling for planting in the cut made by the dibble, the planter means including upright spaced side walls at the rear of the dibble and a bottom ledge which together form a pair of side walls and the bottom of a pocket for receiving and holding a seedling in an upright position prior to planting, an elongated ejector tongue extending downwardly into said pocket to a point adjacent the bottom ledge and forming a frontal wall for the pocket in its forward position, a cover means mounted for movement between a closed position where it forms the rear wall of said pocket and an open position permitting escape of the seedling from the pocket, an ejector mechanism operatively connected to said ejector tongue for moving same rearwardly of the pocket to eject a seedling therefrom into the cut formed by the dibble, and mechanism connected to said cover means for moving same to the open position upon rearward movement of the ejector tongue.

3. Apparatus according to claim 2 wherein said ejector mechanism includes motor means on said planting arm for moving the ejector tongue rearwardly and forwardly of said pocket and also effecting the opening and closing of said cover means, the ejector mechanism further including resilient means interposed between said motor means and said ejector tongue and capable of yielding under the influence of abnormal forces which might otherwise cause damage to said apparatus.

4. Apparatus according to claim 2 wherein said cover means is mounted for pivotal movement in a vertical plane and said mechanism connected thereto is also connected to means fixed relative to the planting arm such that rearward and forward motion of the ejector tongue causes opening and closing respectively of the cover means.

5. Apparatus according to any one of claims 2, 3 or 4 further including packing means adapted to close the cut in the earth and to pack soil around the seedling after placement thereof in the cut in the ground.

6. Apparatus according to any one of claims 2, 3 or 4 including means for sensing the depth said dibble has penetrated the ground and means for actuating said ejector mechanism to cause ejection of the seedling after a selected depth has been sensed.

7. Apparatus according to claim 4 wherein the ejector mechanism includes a housing fixed to the planting arm and through which said resilient means slidably extends, said resilient means including a tubular casing slidable relative to said housing and having spring means therein compressible in the direction of movement of said motor means, one end of said tubular casing being secured to said ejector tongue, and said spring means being operably connected to said motor means, the spring means being sufficiently stiff that under normal conditions the motion of the motor means is transmitted by the spring means to the tubular housing with the spring means yielding under abnormal forces to allow relative motion between the motor means and the tubular casing.

8. Apparatus according to claim 7 wherein said ejector tongue is fixed to said tubular casing at substantially a right angle thereto and is guided in a straight path by virtue of the tubular casing sliding within said housing.

9. Apparatus according to claim 7 wherein said cover means is hinged to said ejector tongue for said pivotal movement, said cover means being configured such that in its closed position it defines, along with said tongue and side walls, an open top or entrance to said pocket to allow easy placement of a seedling in the pocket.

10. Tree planting apparatus comprising:
a mobile frame suitable for forward travel over the ground;
a planting arm pivotally mounted to the frame and extending rearwardly from a mounting location;
means for effecting pivotal motion of the planting arm;
the planting arm including a dibble remote from the mounting location and adapted to cut into the ground when the dibble is urged toward it by said least mentioned means during forward travel of the frame;
planter means carried by the planting arm and adapted to support a containerized seedling for planting in the cut made by the dibble, the planter means including upright spaced side walls at the rear of the dibble and a bottom ledge which together form a pair of side walls and the bottom of a pocket for receiving and holding a containerized seedling in an upright position prior to planting, an elongated ejector tongue extending downwardly into said pocket toward the bottom ledge and forming at least a partial frontal wall for the pocket in its forward position, a cover means mounted for movement between a closed position where it forms the rear wall of said pocket and an open position permitting escape of the seedling from the pocket, an ejector mechanism operatively connected to said ejector tongue for moving said rearwardly of the pocket to eject a seedling from the pocket into the cut formed by the dibble while maintaining the containerized seedling in an upright position, and mechanism connected to said cover means for moving same to the open position upon rearward movement of the ejector tongue to permit escape of the containerized seedling from said pocket into the cut in the ground.

11. Apparatus according to claim 10 wherein said ejector mechanism includes motor means on said planting arm for moving the ejector tongue rearwardly and forwardly of said pocket, the ejector mechanism further including resilient means interposed between said motor means and said ejector tongue and capable of yielding under the influence of abnormal forces which might otherwise cause damage to said apparatus.

12. Apparatus according to claim 11 wherein the ejector mechanism includes a housing fixed to the planting arm and through which said resilient means slidably extends, said resilient means including a tubular casing slidable relative to said housing and having spring means therein compressible in the direction of movement of said motor means, one end of said tubular casing being secured to said ejector tongue, and said spring means being operably connected to said motor means, the spring means being sufficiently stiff that under normal conditions the motion of the motor means is transmitted by the spring means to the tubular housing with the spring means yielding under abnormal forces to allow relative motion between the motor means and the tubular casing.

13. Apparatus according to claim 12 wherein said ejector tongue is fixed to said tubular casing at substantially a right angle thereto and is guided in a straight path by virtue of the tubular casing sliding within said housing.

14. Planting apparatus comprising:
a mobile frame suitable for forward travel over the ground;
a planting arm movably mounted to the frame and extending from a mounting location;
the planting arm including a dibble remote from the mounting location and adapted to cut into the ground when the dibble moves toward it during forward travel of the frame;
planter means carried by the planting arm and adapted to support a seedling for planting in the cut made by the dibble, the planter means including: upright spaced side walls at the rear of the dibble and a ledge which together form a pair of side walls and the bottom of a pocket for receiving and containing a seedling prior to planting, an elongated ejector tongue extending downwardly into said pocket to a point adjacent the ledge and forming a frontal wall for the pocket in its forward position, and an ejector mechanism operatively connected to said ejector tongue for moving same rearwardly of the pocket to eject a seedling therefrom into the cut formed by the dibble, said ejector mechanism including motor means on said planting arm for moving the ejector tongue rearwardly and forwardly of said pocket and resilient means interposed between said motor means and said ejector tongue and capable of yielding under the influence of abnormal forces which might otherwise cause damage to said apparatus, the ejector mechanism further including a housing fixed to the planting arm and through which said resilient means slidably extends, said resilient means including a tubular casing slidable relative to said housing and having spring means therein compressible in the direction of movement of said motor means, one end of said tubular casing being secured to said ejector tongue, and said spring means being operably connected to said motor means, the spring means being sufficiently stiff that under normal conditions the motion of the motor means is transmitted by the spring means to the tubular housing with the spring means yielding under abnormal forces to allow relative motion between the motor means and the tubular casing.

15. Apparatus according to claim 14 wherein said ejector tongue is fixed to said tubular casing at substantially a right angle thereto and is guided in a straight path by virtue of the tubular casing sliding within said housing.

16. Apparatus according to claim 14 further including packing means adapted to close the cut in the earth and to pack soil around the seedling after placement thereof in the cut in the ground.

17. Apparatus according to claim 14 including means for sensing the depth said dibble has penetrated the ground and means for actuating said ejector mechanism to cause ejection of the seedling after a selected depth has been sensed.

* * * * *